United States Patent
Chen et al.

(10) Patent No.: US 7,974,341 B2
(45) Date of Patent: Jul. 5, 2011

(54) RATE CONTROL FOR MULTI-LAYER VIDEO DESIGN

(75) Inventors: Peisong Chen, San Diego, CA (US); Tao Tian, San Diego, CA (US); Vijayalakshmi R. Raveendran, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1404 days.

(21) Appl. No.: 11/416,858

(22) Filed: May 2, 2006

(65) Prior Publication Data

US 2008/0144723 A1    Jun. 19, 2008

Related U.S. Application Data

(60) Provisional application No. 60/677,608, filed on May 3, 2005.

(51) Int. Cl.
*H04N 7/18* (2006.01)
(52) U.S. Cl. .................................. 375/240.1; 375/240.26
(58) Field of Classification Search . 375/240.01–240.29
See application file for complete search history.

(56) References Cited

U.S. PATENT DOCUMENTS

| | | | |
|---|---|---|---|
| 5,515,377 A | 5/1996 | Horne et al. | |
| 6,141,486 A | 10/2000 | Lane et al. | |
| 6,349,284 B1 | 2/2002 | Park et al. | |
| 7,227,894 B2 * | 6/2007 | Lin et al. | 375/240.12 |
| 7,424,730 B2 * | 9/2008 | Chou | 725/87 |
| 7,671,893 B2 * | 3/2010 | Li et al. | 348/211.3 |
| 7,676,722 B2 * | 3/2010 | Setton et al. | 714/748 |

FOREIGN PATENT DOCUMENTS

| | | |
|---|---|---|
| KR | 1020030005166 | 1/2003 |
| WO | 02052860 A1 | 7/2002 |
| WO | WO2004023821 | 3/2004 |

OTHER PUBLICATIONS

International Search Report and Written Opinion—PCT/US2006/017164, International Search Authority—European Patent Office Aug. 30, 2007.

* cited by examiner

*Primary Examiner* — Andy S Rao
(74) *Attorney, Agent, or Firm* — Kevin T. Cheatham

(57) ABSTRACT

Methods and apparatus for efficient encoding multimedia data, such as live video streams are disclosed. The multimedia data is pre-encoded into multiple layers and characteristics of the pre-encoded data are determined. Based at least in part on the determined characteristics, the multimedia data is encoded into multiple layers.

47 Claims, 6 Drawing Sheets

RATE CONTROL FOR MULTI-LAYER VIDEO DESIGN

CLAIM OF PRIORITY UNDER 35 U.S.C. §119

The present application for patent claims priority to Provisional Application No. 60/677,608 entitled "Rate Control For Two Layer Video Design" filed May 3, 2005, and assigned to the assignee hereof and hereby expressly incorporated by reference herein.

BACKGROUND

1. Field

This invention relates to a method and apparatus for encoding and decoding scalable multimedia data with efficient reuse of base layer modules for construction of enhancement layer frames.

2. Background

Due to the explosive growth and great success of the Internet and wireless communication, as well as increasing demand for multimedia services, streaming media over the Internet and mobile/wireless channels has drawn tremendous attention. In heterogeneous Internet Protocol (IP) networks, video is provided by a server and can be streamed by one or more clients. Wired connections include dial-up, ISDN, cable, xDSL, fiber, LAN (local area network), WAN (wide area network) and others. The transmission mode can be either uni-cast or multi-cast. The variety of individual client devices, including PDA (personal digital assistant), laptop, desktop, set-top box, TV, HDTV (high-definition television), mobile phone and others, requires bitstreams of different bandwidths simultaneously for the same content. The connection bandwidth could vary quickly with the time (from 9.6 kbps to 100 Mbps and above), and can be faster than a server's reaction.

Similar to the heterogeneous IP network is mobile/wireless communication. Transport of multimedia content over mobile/wireless channels is very challenging because these channels are often severely impaired due to multi-path fading, shadowing, inter-symbol interference, and noise disturbances. Some other reasons such as mobility and competing traffic also cause bandwidth variations and loss. The channel noise and the number of users being served determine the time-varying property of channel environments. In addition to environmental conditions, the destination network can vary from second to third generation cellular networks to broadband data-only networks due to geographic location as well as mobile roaming. All these variables call for adaptive rate adjustment for multimedia content, even on the fly. Thus, successful transmission of video over heterogeneous wired/wireless networks requires efficient coding, as well as adaptability to varying network conditions, device characteristics, and user preferences, while also being resilient to losses.

To meet different user requirements and to adapt to channel variation, one could generate multiple independent versions of bitstreams, each meeting one class of constraints based on transmission bandwidth, user display and computational capability, but this is not efficient for server storage and multicast application. In scalable coding, where a single macro-bitstream accommodating high-end users is built at the server, the bitstreams for low-end applications are embedded as subsets of the macro-bitstream. As such, a single bitstream can be adapted to diverse application environments by selectively transmitting sub-bitstreams. Another advantage provided by scalable coding is for robust video transmissions on error prone channels. Error protection and error concealment can be performed. A more reliable transmission channel or a better error protection can be applied to base-layer bits that contain the most significant information.

There are spatial, temporal and signal to noise ratio (SNR) scalabilities in hybrid coders like MPEG-1, MPEG-2, MPEG-4 (collectively referred to as MPEG-x), H.261, H.262, H.263, and H.264 (collectively referred to as H.26x). In hybrid coding, temporal redundancy is removed by motion-compensated prediction (MCP). A video is typically divided into a series of groups of pictures (GOP), where each GOP begins with an intra-coded frame (I) followed by an arrangement of forward predicted frames (P) and bidirectional predicted frames (B). Both P-frames and B-frames are inter-frames. The B frame is the key to temporal scalability in most MPEG like coders. However, some profiles, such as the MPEG-4 Simple profile and the H.264 Baseline Profile, do not support B frames. The MPEG-4 standard is described in ISO/IEC 14496-2. The H.264 standard is described in ISO/IEC 14496-10.

In MPEG-4, profiles and levels provide a means of defining subsets of the syntax and semantics based on the decoder capabilities required to decode a particular bitstream. A profile is a defined sub-set of the entire bitstream syntax. A level is a defined set of constraints imposed on parameters in the bitstream. For any given profile, levels generally correspond to decoder processing load and memory capability. So profiles and levels specify restrictions on bitstreams and hence place limits on the capabilities of decoding the bitstreams. In general, a decoder may be deemed to be conformant to a given profile at a given level if it is able to properly decode all allowed values of all syntactic elements of that profile at that level.

SUMMARY

A video encoding and decoding system that enables scalable coding of a video stream into multiple layers, is described. The quality of the base layer encoding and the enhancement layer encoding can be modified so that the transmission bandwidths for the base and enhancement layers satisfy a mathematical relationship, such as a ratio.

One example is a method of encoding multimedia data into at least first and second layers, where each of the first and second layers has an associated transmission bandwidth. The method includes pre-encoding the multimedia data to generate one or more characteristic parameters of the multimedia data, and encoding the multimedia data to generate the at least first and second layers, where the associated bandwidths are determined at least in part based on the characteristic parameters so that the associated bandwidths substantially satisfy a mathematical relationship.

Another example is a multimedia data encoding apparatus configured to encode the multimedia data into at least first and second layers, where each of the first and second layers has a corresponding transmission bandwidth. The apparatus includes a pre-encoder configured to pre-encode the multimedia data to generate one or more characteristic parameters of the multimedia data, and an encoder configured to encode the multimedia data to generate the at least first and second layers, where the corresponding transmission bandwidths are determined at least in part based on the characteristic parameters so that the corresponding bandwidths substantially satisfy a mathematical relationship.

Another example is a multimedia data encoding apparatus configured to encode the multimedia data into at least first and second layers, where each of the first and second layers has a corresponding transmission bandwidth, the apparatus includes means for pre-encoding the multimedia data to generate one or more characteristic parameters of the multimedia data, and means for encoding the multimedia data to generate the at least first and second layers, where the corresponding transmission bandwidths are determined at least in part based on the characteristic parameters so that the corresponding bandwidths substantially satisfy a mathematical relationship.

Another example is a computer readable medium including instructions which when executed cause a system to perform a method of encoding multimedia data into at least first and second layers, where each of the first and second layers has a corresponding transmission bandwidth. The method includes pre-encoding the multimedia data to generate one or more characteristic parameters of the multimedia data, and encoding the multimedia data to generate the at least first and second layers, where the corresponding transmission bandwidths are determined at least in part based on the characteristic parameters so that the corresponding bandwidths substantially satisfy a mathematical relationship.

Another example is a processor configured to pre-encode multimedia data to generate one or more characteristic parameters of the multimedia data, and to encode the multimedia data to generate the at least first and second layers. The corresponding transmission bandwidths are determined at least in part based on the characteristic parameters so that the corresponding bandwidths substantially satisfy a mathematical relationship.

DETAILED DESCRIPTION

Figure 1:
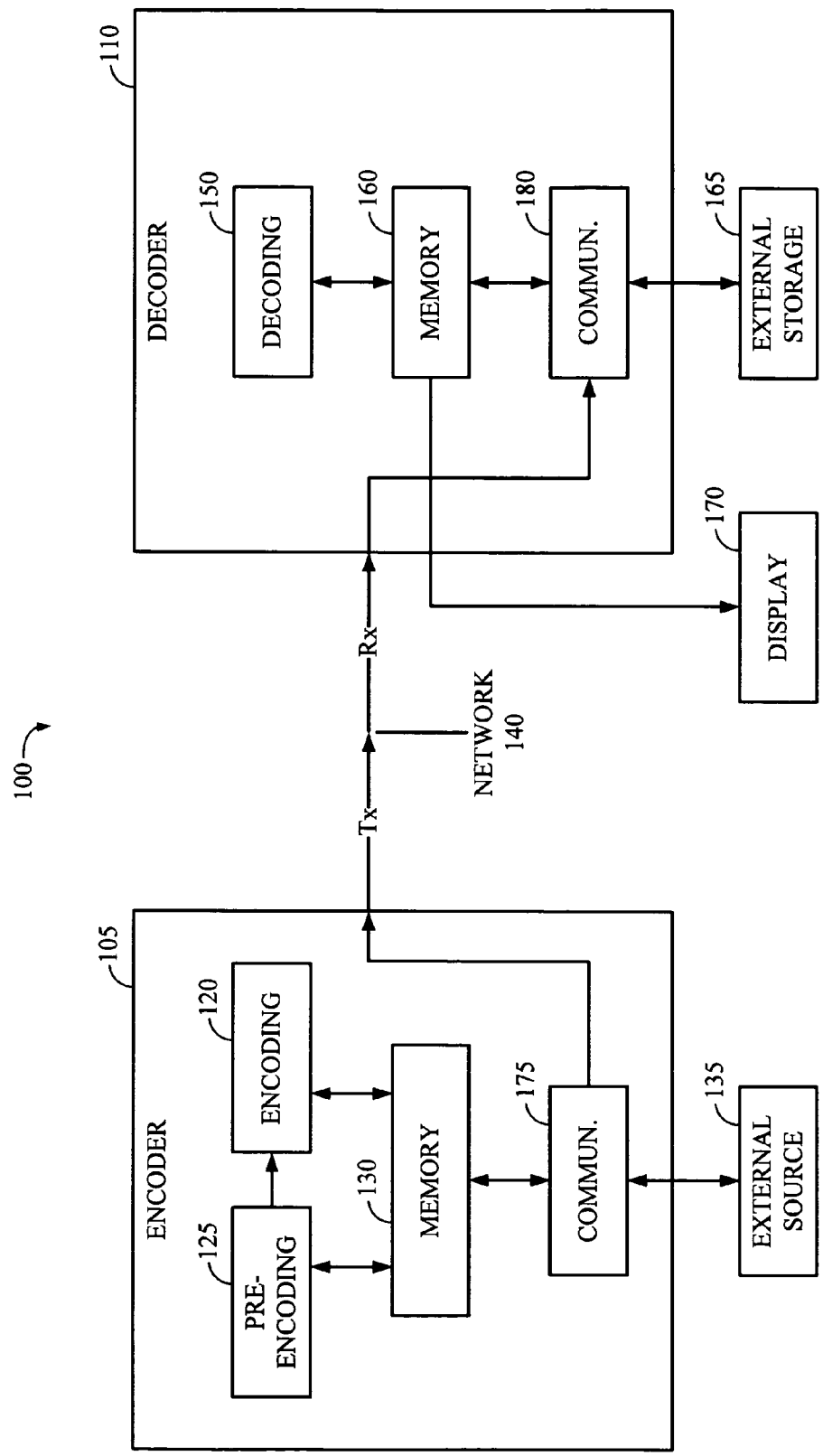
FIG. 1 is a block diagram of a communications system for encoding and decoding streaming pictures.

A method, apparatus and system configured to provide scalable video coded data, where the quality of the base layer encoding and the quality of the enhancement layer encoding can be adjusted so that the transmission bandwidth for the base and enhancement layers satisfy a desired mathematical relationship, such as a ratio, is described. Video frames can be pre-encoded at a pre-encode quality for the purpose of characterizing the raw data. Then, based on the characterization of the raw data, the frames can be encoded such that over a super-frame (e.g. one second of multimedia data), the bandwidth for the base and enhancement layers satisfy a particular mathematical relationship, such as a 1:1 ratio.

In the following description, specific details are given to provide a thorough understanding of the examples. However, it will be understood by one of ordinary skill in the art that the examples may be practiced without these specific details. For example, electrical components may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

A pair of video coding standards, known as MPEG-x and H.26x, describe data processing and manipulation techniques (referred to herein as hybrid coding) that are well suited to the compression and delivery of video, audio and other information using fixed or variable length source coding techniques. In particular, the above-referenced standards, and other hybrid coding standards and techniques, compress, illustratively, video information using intra-frame coding techniques (such as, for example, run-length coding, Huffman coding and the like) and inter-frame coding techniques (such as, for example, forward and backward predictive coding, motion compensation and the like). Specifically, in the case of video processing systems, hybrid video coding systems are characterized by prediction-based compression encoding of video frames with intra- and/or inter-frame motion compensation encoding.

Intra-frame coding refers to encoding a picture (a field or a frame) without reference to any other picture, but the Intra-coded picture can be used as a reference for other pictures. The terms intra-frame, intra-coded frame and I Frame are all examples of video-objects formed with intra-coding that are used throughout this application.

Inter or predictive coding refers to encoding a picture (a field or a frame) with reference to another picture. Compared to the Intra-coded picture, the Inter-coded or predicted picture may be coded with greater efficiency. Examples of inter-coded pictures that will be used throughout this application are predicted frames (either forward or backward predicted, also referred to as P frames), and bi-directional predicted frames (also referred to as B Frames). Other terms for inter-coding include high-pass coding, residual coding, motion compensated interpolation and others that are well known to those of ordinary skill in the art.

A technique, known as scalable coding, can divide encoded data into different layers in the bitstream such as, for example, a base layer and an enhancement layer. Scalable coding is useful in dynamic channels, where scalable bitstreams can be adapted to match fluctuations in network bandwidth. In error-prone channels, scalable coding can add robustness through unequal error protection of the base layer and the enhancement layer. Better error protection can be applied to the more important layer.

FIG. 1 is a block diagram of a communications system for encoding and decoding streaming pictures. The system 100 includes encoder device 105 and decoder device 110. Encoder device 105 further includes encoding component 120, pre-encoding component 125, memory component 130 and communications component 175. Encoder device 105 is able to receive data from external source 135 using communication logic contained in communications component 175. External source 135 could be, for example, external memory, the Internet, a live video and/or audio feed, and receiving the data can include wired and/or wireless communications. The data contained in external source 135 can be in a raw (not encoded) or encoded state. Pre-encoding component 125 is configured to perform an initial encoding of the data and to generate one or more parameters characterizing the raw data. Characterizing parameters such as a complexity metric can be generated by pre-encoding component 125. Encoding component 120 is configured to encode the raw data based on the characterizing parameters generated in the pre-encoding component 125. Each of pre-encoding component 125 and encoding component 120 are configured to encode both intra-coded portions of frames and predicted portions of frames, including forward prediction, backward prediction and bi-directional prediction.

Each of pre-encoding component 125 and encoding component 120 is configured to determine which portions of multimedia data should be intra-coded, and which portions should be inter-coded. Each of pre-encoding component 125 and encoding component 120 is configured to determine which portions of video are low priority and should be placed in the enhancement layer, and which portions are high priority and should be placed in a base layer. Each of pre-encoding component 125 and encoding component 120 is configured to encode overhead information that can include a map of intra-coded and inter-coded portions, such as, for example a macroblock map where macroblocks (or sub-macroblocks) are identified as being intra-coded or inter-coded (also identifying which type of inter-coding including, for example forward, backward or bi-directional) and to which frame(s) inter-coded portions are referenced. After encoding, the encoded frames are stored in memory component 130 or external memory. The external memory can be contained within external source 135 or a separate memory component (not shown).

Communications component 175 contains logic used for data transmission (Tx) in conjunction with network 140. Network 140 can be part of a wired system such as telephone, cable, and fiber optic, or a wireless system. In the case of wireless communication systems, network 140 can comprise, for example, part of a code division multiple access (CDMA or CDMA2000) communication system or alternately, the system can be a frequency division multiple access (FDMA) system, an orthogonal frequency division multiple access (OFDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques. The encoded frames are transmitted (Tx) over network 140. The encoding processes performed by encoder device 105 are more fully described below.

Decoder device 110 contains similar components to encoder device 105, including decoding component 150, memory component 160 and communications component 180. Decoder device 110 receives encoded data that has been transmitted over network 140 or from external storage 165. Communications component 180 contains logic used for receiving (Rx) encoded data in conjunction with network 140, as well as logic for receiving encoded data from external storage 165. External storage 165 could be, for example, external RAM or ROM, or a remote server. Decoding component 150 is used to decode intra-coded data, and inter-coded data. Decoding component 150 also decodes both P frames (forward or backward predicted) as well as B frames.

Decoding component 150 also contains logic used for decoding the overhead information, including the macroblock map discussed above, and translating this information so as to decode the appropriate macroblocks in the appropriate way. Decoding component 150 also contains logic used to skip decoding of enhancement layer data including bi-directionally predicted frames and/or low priority multimedia data. Decoding of enhancement layer data can be skipped if, for example, the enhancement layer data is not received or received with poor or insufficient SNR, and/or if there is insufficient processing power at the decoder device. After decoding, the decoded frames can be displayed with display component 170 or stored in internal memory 160 or external storage 165. Display component 170 can be an integrated part of the decoding device that contains such parts as video display hardware and logic, including a display screen, or it can be an external peripheral device. The decoding processes performed by decoder device 110 are more fully described below.

Figure 2A:
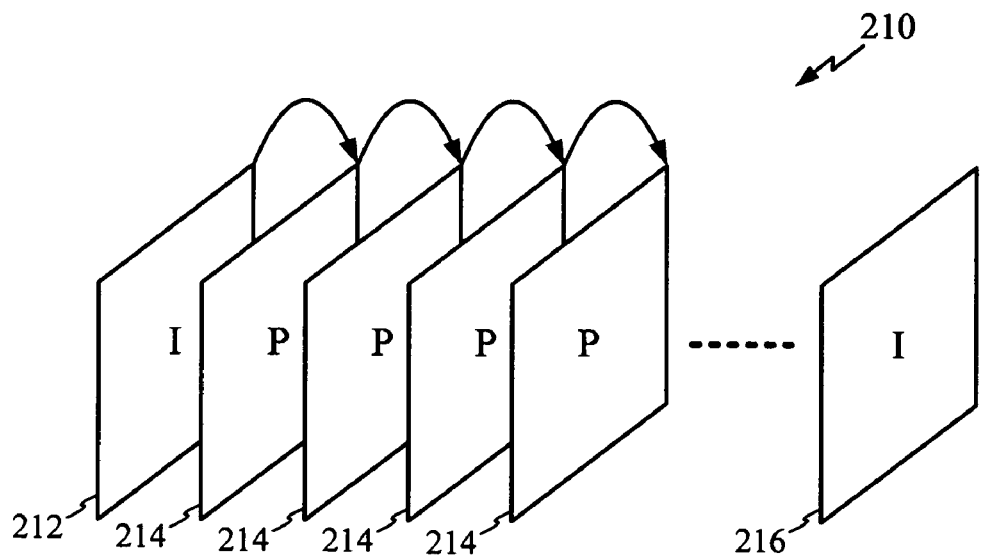
FIG. 2A is a diagram illustrating a conventional MPEG-4 Simple Profile data stream.

In a typical MPEG decoder, predictive coded pixel blocks (i.e., blocks that comprise one or more motion vectors and a residual error component) are decoded with respect to a reference frame (where an intra-frame or another predicted frame can serve as a reference frame). FIG. 2A is a diagram illustrating a conventional MPEG-4 Simple Profile data stream, which depicts frame dependencies for a GOP. GOP 210 is made up of initial I Frame 212, followed by several forward predicted P frames 214. The dependency of P frames on a previous I or P frame can limit the temporal scalability afforded to a system (systems such as those conforming to the MPEG-4 Simple and H.264 Baseline Profiles) that may only support forward predicted frames. Removing any of the P frames 214 may result in a loss of information that may be crucial in decoding other P frames. P frame removal may result in, for example, video jitter or the inability of the decoder to continue decoding until the next I frame 216, which marks the beginning of the next GOP.

Figure 2B:
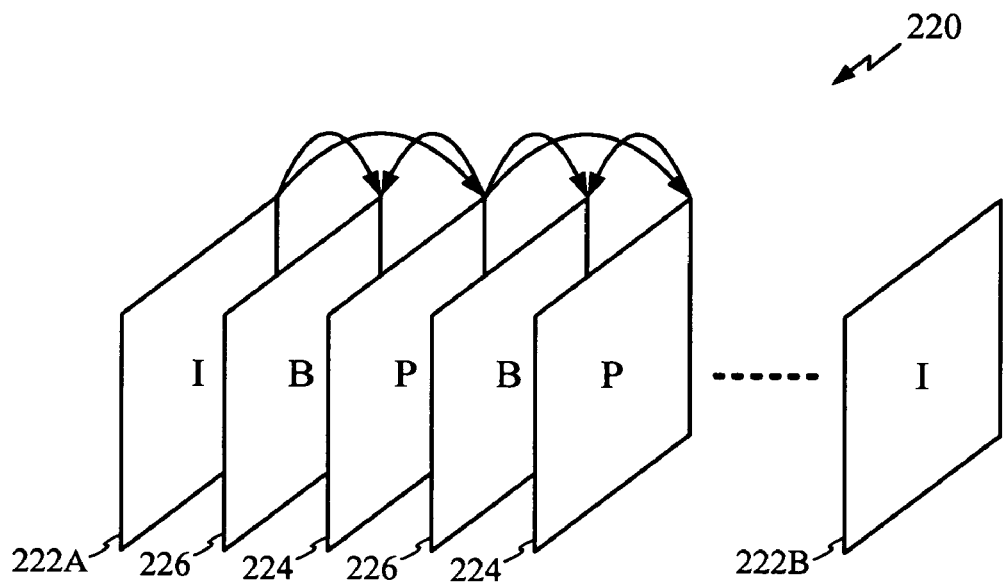
FIG. 2B is a diagram illustrating a conventional encoded data stream that enables temporal scalability.

Use of bi-directional predicted data in an enhancement layer of a scalable video coding system could be useful in dynamic channels as discussed above. FIG. 2B is a diagram illustrating a conventional encoded data stream that enables temporal scalability, which depicts the frame dependencies of a GOP. GOP 220 is made up of I frame 222A, forward predicted P frames 224, and bi-directional predicted B frames 226. Each B frame can combine forward and backward motion vectors and residual errors referenced to I frame 222A or forward predicted P frames 224 (backward predicted P frames could also be used but are not shown in this example). I frame 222B marks the beginning of the next GOP. As shown in FIG. 2B, only one B frame 226 is contained between I frame 222A and P frame 224 or between two P frames 224. Several B frames could be inserted between reference frames to allow for greater flexibility in temporal scalability. Since no other frames may depend on the B frame as a reference frame, one could remove B frames 226 without loss of information regarding the decoding of other frames. This characteristic of B frames 226 can allow B frames 226 to be inserted into a bitstream, where the B frames 226 can be removed at the option of an encoder, a transcoder or a decoder to accommodate channel conditions, bandwidth limitations, battery power as well as other considerations. For example, if there are three B frames between reference frames, then one could remove all three B frames and reduce the frame rate by three quarters or one could keep the B frame in the middle and remove the other two to reduce the frame rate by one half. The data rate could decrease accordingly.

Figure 3:
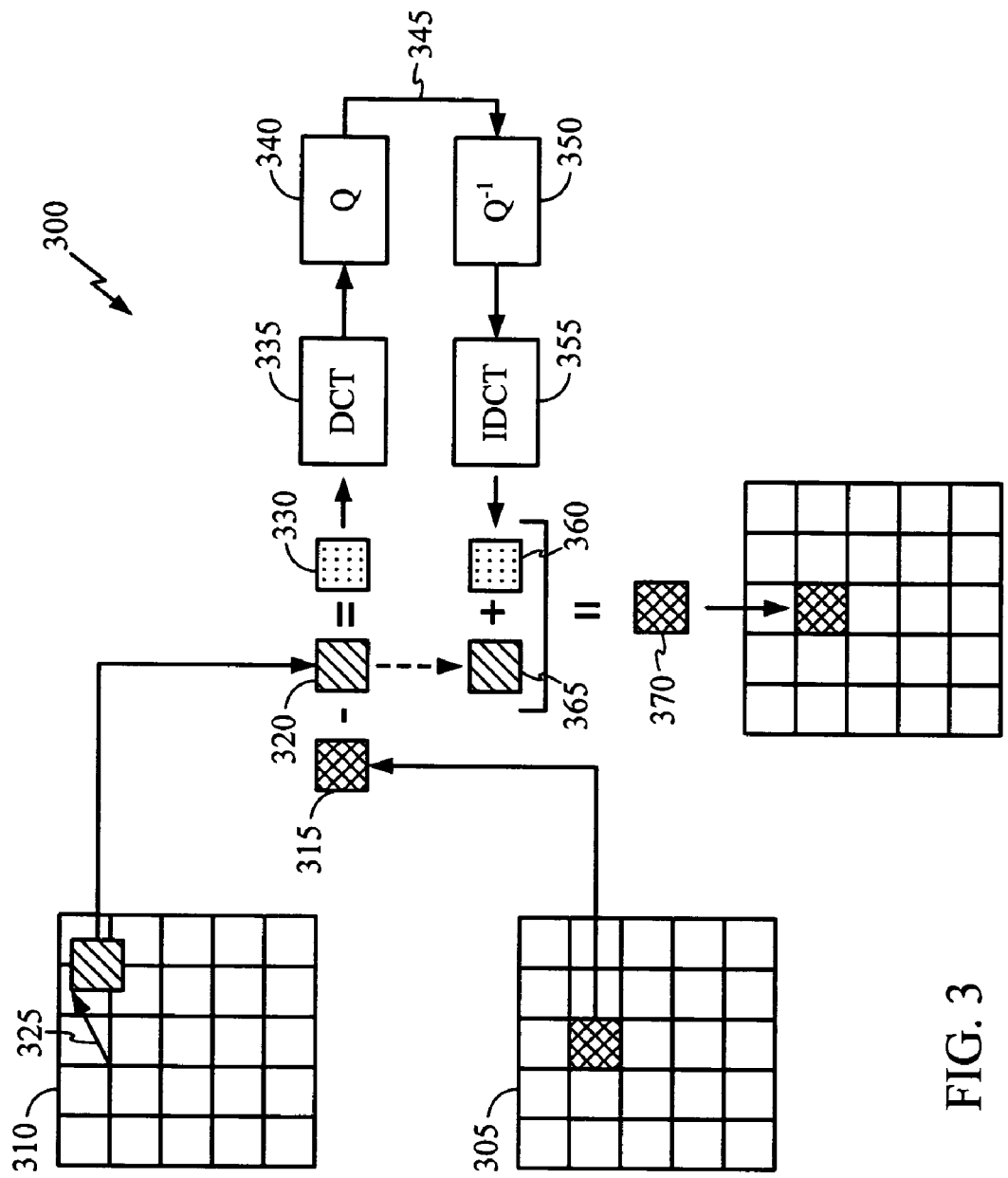
FIG. 3 is an illustration of an example of a P Frame construction process in MPEG-4.

P Frames (or any inter-coded sections) can exploit temporal redundancy between a region in a current picture and a best matching prediction region in a reference picture. The difference between the current region and the best matching reference prediction region is known as residual error (or prediction error). The location of the best matching prediction region in the reference frame can be encoded in a motion vector. FIG. 3 is an illustration of an example of a P Frame construction process in, for example, MPEG-4. Process 300 includes current picture 305 made up of 5×5 macroblocks, where the number of macroblocks in this example is arbitrary. A macroblock is made up of 16×16 pixels. Pixels can be defined by an 8-bit luminance value (Y) and two 8-bit chrominance values (Cr and Cb). In MPEG, Y, Cr and Cb components can be stored in a 4:2:0 format, where the Cr and Cb components are down-sampled by 2 in the X and the Y directions. Hence, each macroblock would consist of 256 Y components, 64 Cr components and 64 Cb components. Macroblock 315 of current picture 305 is predicted from reference picture 310 at a different time point than current picture 305. A search is made in reference picture 310 to locate best matching macroblock 320 that is closest, in terms of Y, Cr and Cb values to current macroblock 315 being encoded. Methods of searching for best matching macroblock 320, known by those of ordinary skill in the art, include a) minimizing SAD (sum of absolute pixel differences) between current macroblock 315 and reference picture 310 macroblocks, b) minimizing SSD (sum of squared pixel differences), and c) minimum cost in a rate distortion sense, and others. The location of best matching macroblock 320 in reference picture 310 is encoded in motion vector 325. Reference picture 310 can be an I Frame or P Frame that the decoder will have reconstructed prior to the construction of current picture 305. Best matching macroblock 320 is subtracted from current macroblock 315 (a difference for each of the Y, Cr and Cb components is calculated) resulting in residual error 330. Residual error 330 is encoded with 2D Discrete Cosine Transform (DCT) 335 and then quantized 340. Quantization 340 can be performed to provide spatial compression by, for example, allotting fewer bits to the high frequency coefficients while allotting more bits to the low frequency coefficients. The quantized coefficients of residual error 330, along with motion vector 325 and reference picture 310 identifying information, are encoded information representing current macroblock 315. The encoded information can be stored in memory for future use or operated on for purposes of, for example, error correction or image enhancement, or transmitted over network 345.

The encoded quantized coefficients of residual error 330, along with encoded motion vector 325 can be used to reconstruct current macroblock 315 in the encoder for use as part of a reference frame for subsequent motion estimation and compensation. The encoder can emulate the procedures of a decoder for this P Frame reconstruction. The emulation of the decoder will result in both the encoder and decoder working with the same reference picture. An example of a reconstruction process, whether done in an encoder, for further intercoding, or in a decoder, is presented here. Reconstruction of a P Frame can be started after the reference frame (or a portion of a picture or frame that is being referenced) is reconstructed. The encoded quantized coefficients are dequantized 350 and then 2D Inverse DCT, or IDCT, 355 is performed resulting in decoded or reconstructed residual error 360. Encoded motion vector 325 is used to locate the already reconstructed best matching macroblock 365 in the already reconstructed reference picture 310. Reconstructed residual error 360 is then added to reconstructed best matching macroblock 365 to form reconstructed macroblock 370. Reconstructed macroblock 370 can be stored in memory, displayed independently or in a picture with other reconstructed macroblocks, or processed further for image enhancement.

B Frames (or any section coded with bi-directional prediction) can exploit temporal redundancy between a region in a current picture and a best matching prediction region in a previous picture and a best matching prediction region in a subsequent picture. The subsequent best matching prediction region and the backward best matching prediction region are combined to form a combined bi-directional predicted region. The difference between the current picture region and the best matching combined bi-directional prediction region is a residual error (or prediction error). The locations of the best matching prediction region in the subsequent reference picture and the best matching prediction region in the previous reference picture can be encoded in two motion vectors.

As described above, the information of each of the I Frames, P Frames, and B Frames may be encoded in multiple layers, for example, a base layer may have certain minimum information, such as header information, and motion vector and residual error information for predicted frames, as well as I Frame data. An enhancement layer may have information which may not be necessary, but when optionally decoded enhances the quality of the displayed data. For example, the enhancement layer may have I Frame data and residual data for P Frames and B Frames encoded with a higher quality than the data in the base layer. The quality of the encoded data may be adjusted through modification of various encoding parameters, such as the quantization parameter (QP), which determines a quantization level of the encoded data. For example, the QP may be increased, resulting in encoded data which has higher quantization, and hence fewer bits and therefore a decreased bandwidth requirement. The enhancement layer may also include additional frames, such as B Frames, that are not included in the base layer. Both the base and enhancement layers may be transmitted to the decoder.

In some systems, it is desirable to allocate bandwidth according to a specified mathematical relationship, such as a ratio, or a ratio plus a constant. For example, in some embodiments, the ratio of the bandwidth of the enhancement layer to the bandwidth of the base layer is 1:1, wherein the bandwidth allocated to the base layer is equal to the bandwidth of the enhancement layer. Other ratios may also be desirable, such as 1.5:1, 2:1

In some embodiments, it is desirable to achieve a 1:1 ratio of bandwidths for each GOP. Some embodiments encode I Frame data and P and B Frame residual data of the GOP at the enhancement layer quality. The size of encoded data then determines a desired bandwidth for the total base plus enhancement layers. The bandwidth for the base layer is then determined based on the desired mathematical relationship between the base layer bandwidth and the enhancement layer bandwidth.

Once the bandwidth for the base layer is known, the bandwidth for each of the base layer elements can be determined. In some embodiments, the bandwidth of certain fixed quality base layer elements may be independent of the bandwidth of the entire base layer. For example, in some embodiments, at least one of the header information and the motion vector information of the predicted frames may be encoded at a fixed quality into the base layer. For example, in some embodiments, the header and motion vector information may be encoded at the same high quality as the enhancement layer. The fixed quality for the header and motion vector information determines a size, and therefore, a bandwidth requirement for these fixed quality base layer elements. Once the bandwidth requirement for the fixed quality base layer elements is known, the remaining base layer bandwidth can be allotted to the remaining variable quality base layer elements, such as the I Frame data and the P and B Frame residues.

Accordingly, the variable quality base layer elements may be encoded with a quality such that the resulting data may be transmitted with the remaining bandwidth.

Figure 4:
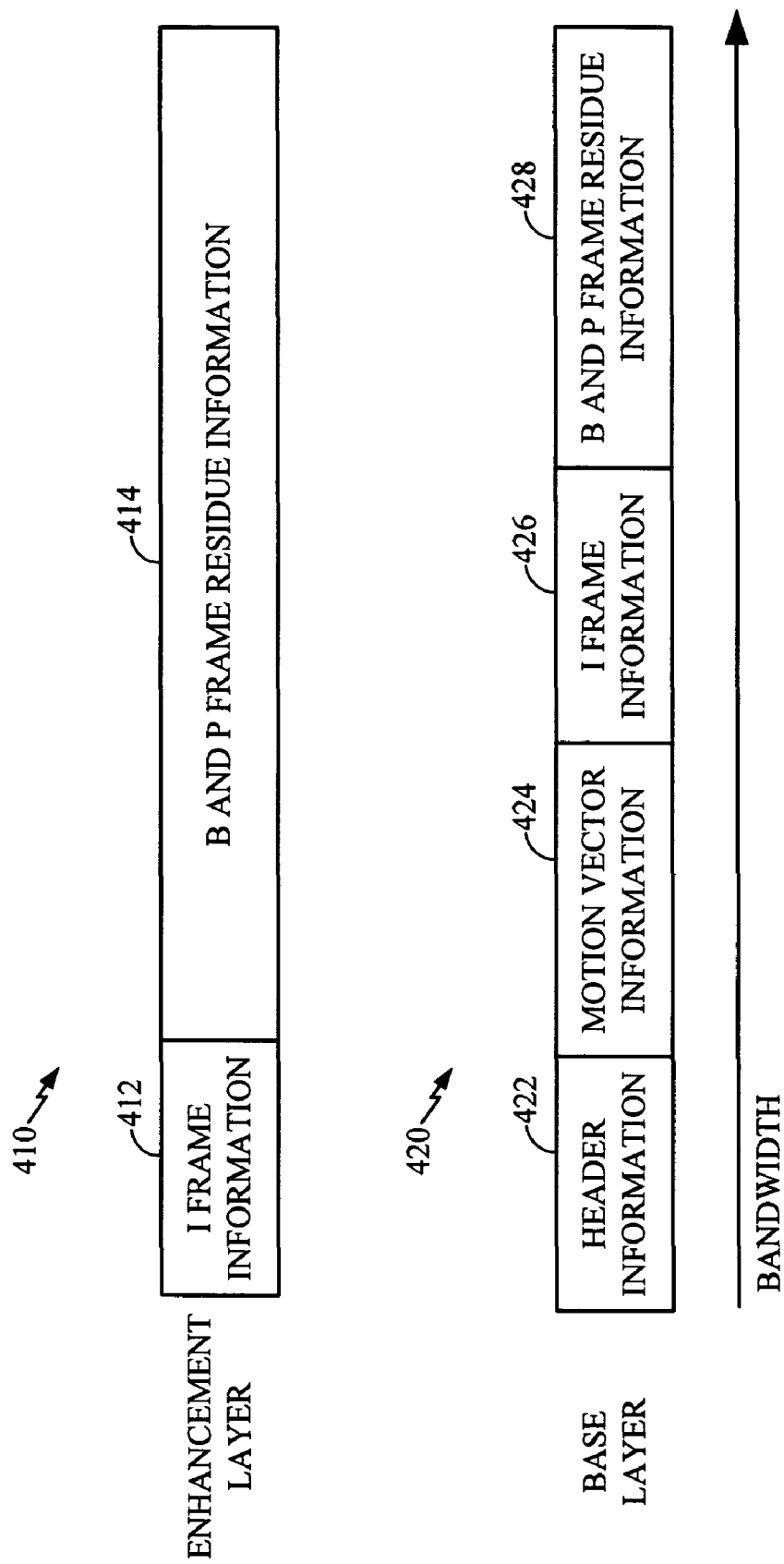
FIG. 4 is a bandwidth allocation diagram depicting a bandwidth allocation methodology.

FIG. 4 is a bandwidth allocation diagram depicting the bandwidth allocation methodology described above. Encoded enhancement layer information 410 and encoded base layer information 420 is depicted, where the horizontal dimension of each represents the allotted bandwidth of each. As shown, in this example, the total bandwidth of each layer is identical. The enhancement layer contains I Frame information 412 and B and P Frame information 414 encoded at a high, enhancement layer quality. The base layer contains header information 422, motion vector information 424, I Frame information 426, and B and P Frame information 428. In order to generate the base layer such that it can be transmitted with the same bandwidth as the enhancement layer, the I Frame information 426 and the B and P Frame information 428 are each encoded with a base layer quality, the base layer quality being less than that of the enhancement layer.

Various modifications can be made to the above described scheme. For example, in some embodiments, B Frame information is not encoded into the base layer. In such embodiments, the decoder can decode B Frame information if it receives and is able to process the enhancement layer. In some embodiments, the ratio of enhancement layer bandwidth to base layer bandwidth is not 1:1, but another ratio. In some embodiments the I Frame information 412 is encoded with a quality different from that of the B and P Frame residue information 414. Similarly, in some embodiments, the I Frame information 426 is encoded with a quality different from that of the B and P Frame residue information 428.

In the example of FIG. 4, the bandwidths of the enhancement layer and the base layer are substantially identical over the GOP. In some embodiments, the 1:1 ratio does not hold for at least some smaller portions of the data, such as for frames or for macroblocks. For example, in some embodiments, the base layer bandwidth for the entire GOP minus the bandwidth allocated to the fixed quality elements is allocated to the variable quality elements according to characteristic parameters of each of the variable quality elements determined in a pre-encode operation.

Figure 5:
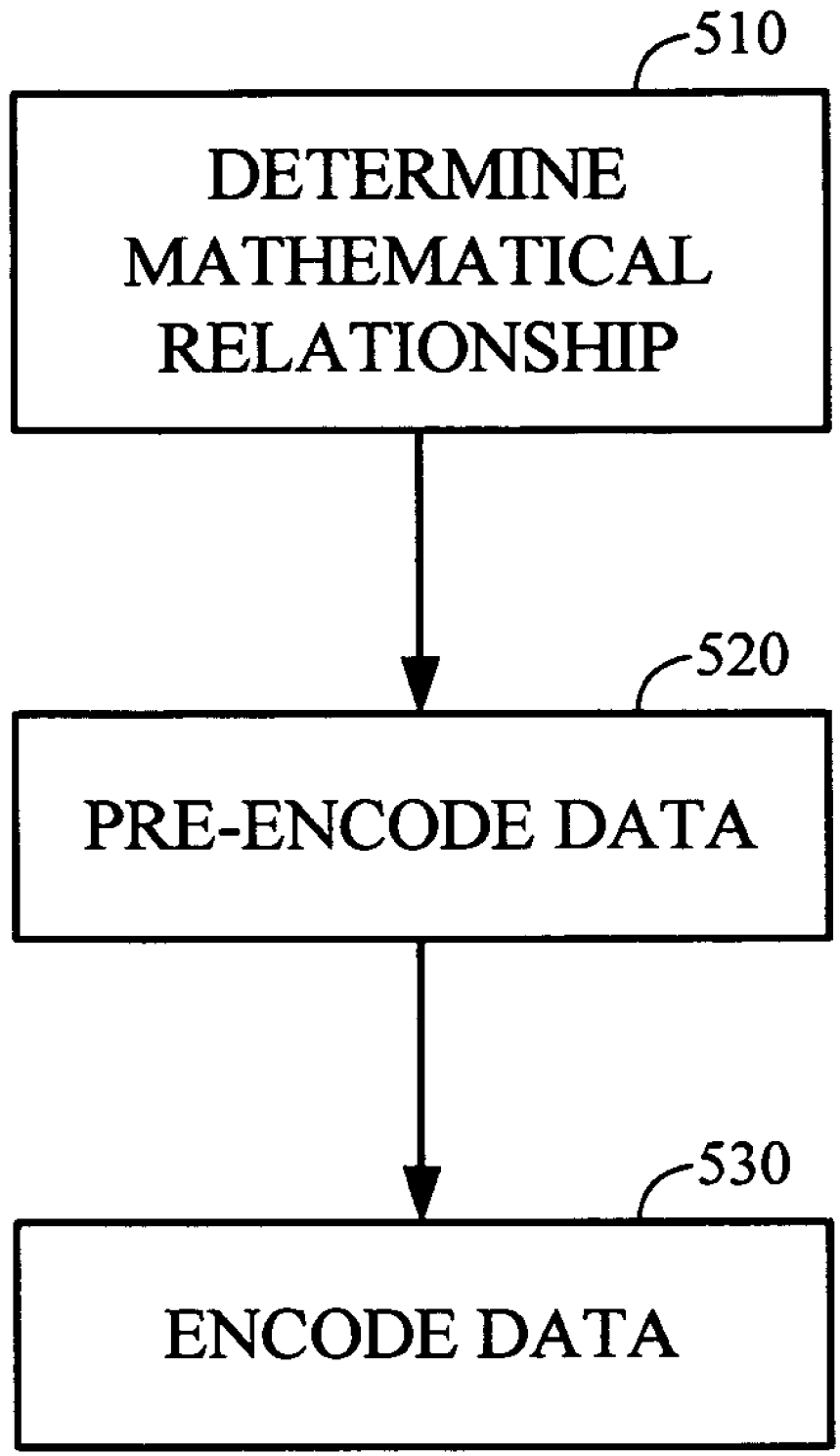
FIG. 5 is a flow chart showing a method for encoding multimedia data.

FIG. 5 is a flow chart showing a method for encoding multimedia data. At 510 a mathematical relationship between the bandwidth of the enhancement layer and the bandwidth of the base layer is determined. In some embodiments, the mathematical relationship is a ratio in a memory location, for example a 1:1 ratio, where the enhancement layer bandwidth is substantially equal to the base layer bandwidth. In some embodiments, the mathematical relationship is determined based on an algorithm.

At 520 the multimedia data is pre-encoded. The multimedia data may be pre-encoded at a high quality. Characterizing parameters of the pre-encoded data are measured. Various complexity metrics of the encoded data can be determined by pre-encoding the multimedia data. For example, the size of encoded frames is measured and stored. Other parameters may also be measured and stored. The parameters of various portions of the data may be measured. For example, complexity of the encoded information may be measured for GOPs, frames, slices, macroblocks, and sub-macroblocks. In some embodiments, a GOP is a super-frame, containing one second of multimedia data.

At 530 the multimedia data is encoded according to the characterizing parameters measured at 520. In one example, the I Frame data and the B and P Frame residues are encoded at a high enhancement layer quality into the enhancement layer. According to methods described above, the enhancement layer and base layer bandwidths for the GOP are then determined. According to methods described above, the bandwidths of fixed quality elements, such as header information and motion vector information, is also determined.

Next, the base layer bandwidth for the entire GOP ($BW_{BL}$) minus the bandwidth allocated to the fixed quality elements of the base layer ($BW_{fqe}$) is allocated to the variable quality elements of the base layer ($BW_{vqe}$). Accordingly, $BW_{vqe} = BW_{BL} - BW_{fqe}$. The $BW_{vqe}$ is allocated among the variable quality elements of the base layer according to the characterizing parameters, such as a complexity metric, of each of the variable quality elements determined in the pre-encode operation of 520. For example, the complexity metric determined in the pre-encode operation of 520 may be a size for each encoded frame. The allocated bandwidth for frame i ($BW_{vqe(i)}$) may be a portion of the total $BW_{vqe}$ weighted according to the complexity of the frame i as determined in the pre-encode operation of 520. Accordingly, $BW_{vqe(i)} = BW_{vqe} \times Size_{(i)}/Size_{total}$, where $Size_{(i)}$ is the size of the frame i encoded in 520, and $Size_{total}$ is to total of the sizes of all of the frames of the GOP encoded in 520. The result is a bandwidth allocation for each frame of the GOP. Once each frame has an allocated bandwidth, the information for each frame is encoded with a maximum quality which will allow the encoded frame to be transmitted with the allocated bandwidth.

Figure 6:
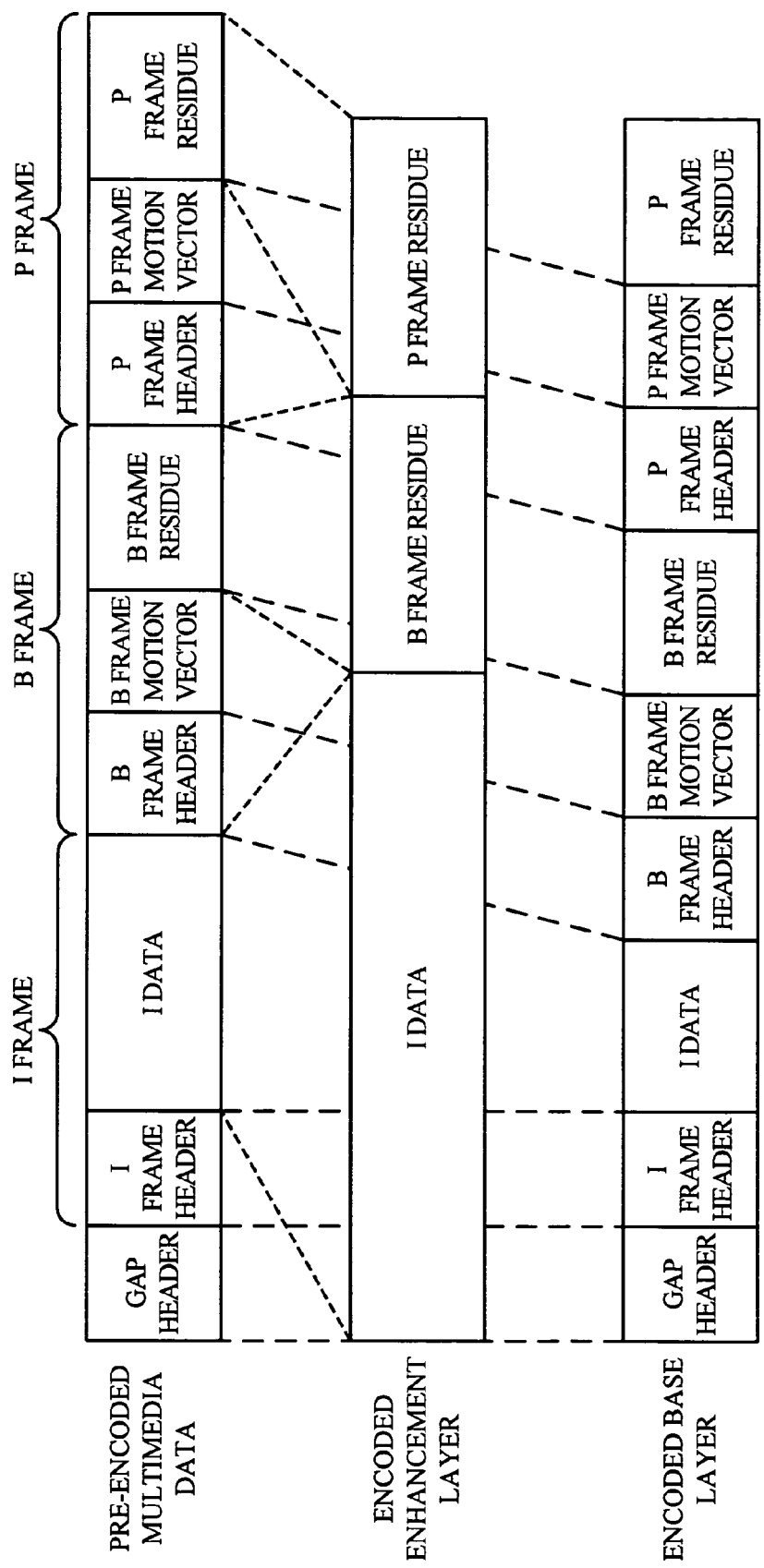
FIG. 6 is a graphical representation of a bitstream.

FIG. 6 is a graphical representation of a bitstream that can result from a pre-encode operation on a multimedia GOP, and the results of subsequent encode operations which generate a bitstream for an enhancement layer for the GOP and a bitstream for a base layer for the GOP. In this example, the GOP comprises a GOP header, and three frames; an I Frame; a B Frame; and a P Frame. The I Frame comprises a header, and the B and P Frames each comprise a header and a motion vector.

As shown, the pre-encoded bitstream includes all of the header information, the motion vector information, the I Frame data, and the residue information from the B and P Frames. In this example, the pre-encode operation encodes at a high quality, producing a bitstream with quality substantially identical to the quality of the enhancement layer video. The enhancement layer bitstream comprises the I Frame data, and the B and P Frame residue information, encoded at an enhancement layer quality. In some embodiments, the enhancement layer may be generated with higher or lower quality than the pre-encoded data. As discussed above, in this example, the base layer bitstream has substantially the same size, and therefore bandwidth, as the enhancement layer bitstream. However, because the base layer also includes header and motion vector information, which may be encoded at an enhancement layer quality, the I Frame data and the B and P Frame header and residue information would be encoded at a quality less than that of the enhancement layer. The allocation of bandwidth for each of the I Frame data, the B Frame residue, and the P Frame residue in the base layer can be weighted according to the complexity of the corresponding pre-encoded data as determined by the pre-encoding process.

In some embodiments a multimedia data encoding apparatus can be configured to encode the multimedia data into at least first and second layers. Each of the first and second layers has a corresponding transmission bandwidth. The apparatus includes means for pre-encoding the multimedia data to generate one or more characterizing parameters of the multimedia data, and means for encoding the multimedia data to generate the at least first and second layers. The means for pre-encoding can be an encoder configured to encode with a desired quality, and the means for encoding can be another or the same encoder configured to encode with the same or with another quality. The transmission bandwidths are determined at least in part based on the characterizing parameters so that the bandwidths substantially satisfy a mathematical relationship.

In some embodiments a total bandwidth allotment for both the base layer and the enhancement layer is determined by a multiplexer (MUX), which determines bandwidth for multiple applications. It is advantageous when the sum of the base layer bandwidth and the enhancement layer bandwidth do not go beyond the limit set by the MUX. The MUX tries to allocate bits to different programs in a fair manner. The fairness is defined as different programs have similar quality. So the total bandwidth can be allocated to different programs more effectively. Since the MUX may cut bit rates for certain programs because of the limitation of total bandwidth, it is advantageous to have 2 pass coding on a superframe (SF) basis, where a SF is 1 s of multimedia data.

Furthermore, the base layer and the enhancement layer need to keep, for example, a 1:1 ratio on a SF basis but for each frame there may be no such 1:1 restriction on the ratio of the base layer frame and the enhancement layer frame. Therefore, the 2 pass coding on a SF basis will also be helpful to allocate bits to each frame based on frame complexity while having 1:1 ratio on a SF basis.

During the pre-encode, the encoding can target the enhancement layer quality, target the base layer quality, or another quality and multiply the base layer bit rate by 2 to get the bit rate for the sum of the base layer and enhancement layer. Which approach to choose depends on the encoder design and which layer is chosen to be optimized first. Because in some embodiments, both layers can be received, the enhancement layer quality can be optimized first. Pre-encoding is a characterization of the multimedia data, and will provide a reference quality of the base layer and enhancement layer. In this example, based on the characterization, the base layer quality will be inferred subjected to the requirement of 1:1 ratio.

There are a number of reasons for the pre-encoding operations. While encoding multimedia data at a preferred quality, a total desired bandwidth is determined, and can be given to the MUX. Another reason is to gather information for rate control for the subsequent encoding. After finishing the pre-encoding of the whole SF, the encoder will have a full picture of which parts of the SF need more bandwidth. Moreover, the rate control model, which is an essential tool for bit allocation can be more accurately built. Usually in single-pass coding, the model based on the encoding of neighboring macroblocks (MBs) is used for the current MB.

Based on the pre-encoding results, the apparatus can estimate the base layer and the enhancement layer SF size.

For I frames, there are only Intra MBs. The MB header information such as MB mode, spatial prediction direction can be encoded into the base layer. The coefficient information can be encoded into both the enhancement layer and the base layer. The estimated base layer frame size after the encoding is $\hat{f}^b_{2,i} = f_{1,i}(\text{header}) + \alpha_1^{\Delta qp} f_{1,i}(\text{Intra coeff})$, where $f_{1,i}(\text{header})$ and $f_{1,i}(\text{Intra coeff})$ represent the number of header bits and the number of the coefficient bits of frame i in the $1^{st}$ pass coding respectively. $\alpha_1$ is estimated based on the $2^{nd}$ pass coding. $\Delta qp$ is the difference between the $1^{st}$ pass QP and the preferred base layer QP.

The estimated EL frame size in the $2^{nd}$ pass coding is $\hat{f}^e_{2,i} = (1-\alpha_1^{\Delta qp}) f_{1,i}(\text{Intra coeff})$. For P frames, the motion information will be sent at the base layer. The number of bits in this part is known exactly. Similar to I frames, the coefficient bits will be estimated based on an exponential function.

Therefore, the BL frame size is defined as $\hat{f}^b_{2,i} = f_{1,i}(\text{header}) + \alpha_{P,Inter}^{\Delta qp_{P,Inter}} f_{1,i}(\text{Inter coeff}) + \alpha_{P,Intra}^{\Delta qp_{P,Intra}} f_{1,i}(\text{Intra coeff})$, Where $f_{1,i}(\text{header})$ represents the bits for MB mode and motion information in the pre-encode, $f_{1,i}(\text{Inter coeff})$ represents the bits for the coefficients of inter MBs in the pre-encode, $f_{1,i}(\text{Intra coeff})$ represents the bits for the coefficients of intra MBs in the pre-encode, $\Delta qp_{P,Inter}$ is the QP difference between BL and the pre-encode Inter MBs, $\Delta qp_{P,Intra}$ is the QP difference between BL and the pre-encode Intra MBs, and $\alpha_{P,Inter}$ and $\alpha_{P,Intra}$ are coefficients decided by experiments.

The EL frame size is defined as $\hat{f}^e_{2,i} = (1-\alpha_{P,Inter}^{\Delta qp_{P,Inter}}) f_{1,i}(\text{Inter coeff})$. For B frames, if they only exist at one layer, their size can be added directly into that layer's SF size. If they have two layers, their contribution to each layer is estimated in the same way as P frames.

The estimated BL SF size $\tilde{S}_b$ is defined as $$\tilde{S}_b = \sum_i \hat{f}^b_{2,i}.$$

The estimated EL SF size $\tilde{S}_e$ is defined as $$\tilde{S}_e = \sum_i \hat{f}^e_{2,i}.$$

The bit rate request sent to MUX will be $\text{MAX}(\tilde{S}_b, \tilde{S}_e) \times 2$. Based on the required bit rate requested by different programs, the MUX will return the upper bound for each program.

Usually in single-pass coding, the complexity metric is based on statistics of the residual after temporal prediction and the rate-control model is built upon the encoding of neighboring MBs. All of these could cause the discrepancy between the model and the real scenario. Instead, by using the pre-encoding results, we can build an accurate complexity metric reflecting the coding complexity for the encode operation. A rate-control model based on this scheme can help allocate bits more effectively at the encoding operation.

The metric can be based on the number of bits of each MB in the pre-encoding operation. Since the different MBs could use different QPs, we normalize all MBs to the same QP using an exponential relationship and derive the corresponding coefficient bits. This process is advantageous because reducing inter MB QP will significantly increase the coefficient bits, which may not reflect the true motion complexity. For the same reason, the inter MB coefficient bits are adjusted in the first frame (according to the encoding order) of a SF if it is a P frame. The adjustment can be based on the MB QP of the first P frame and the QP of the reference area. The header bits may have no change. Then the complexity metric of each MB is the total bits of its header and coefficients. The complexity metric of each frame is the sum of the complexity metric of its MBs.

In the encoding operation, for each layer, there is rate control for a target bit rate, $W_b(0)$ for the base layer and $W_e(0)$ for the enhancement layer. During 2 layer rate control, the base layer and enhancement layer overhead with respect to single layer coding should be minimized. Dramatically changing QP at the base layer can introduce a significant amount of overhead. Based on the statistics collected during the pre-encoding, the encode operation bit allocation at the base layer can be more accurate to avoid this kind of problem.

In the base layer encoding, a one-second buffer can be used to smooth out variations in the instantaneous output rate inside an SF. But unlike in the conventional leaky bucket model, neighboring SFs have independent buffers. So the smooth-out effect only happens inside an SF.

$W_b(j)$ is the remaining base layer bandwidth of the current SF after encoding the $(j-1)^{th}$ frame. At the start of the SF, j=1. $W_b(j)$ is updated frame by frame as follows: $W_b(i)=W_b(i-1)-S_b(j-1)$, where $S_b(j-1)$ is the number of bits generated by the $(j-1)^{th}$ frame.

The projected frame size is $$R(j) = W_b(j) \times \frac{\beta(n_j)}{\sum_{k=j}^{N(j)-1} \beta(n_k)},$$

where N(j) is the remaining unencoded frame of the current SF. $\beta(n_j)$ is the complexity metric of the $j^{th}$ frame decided in the pre-encoding.

A basic unit can be either one or multiple MBs. The size of the basic unit determines how frequently QP can be adjusted. However, too much QP adjustment increases overhead. MBs of similar statistics can be grouped together and assigned a single QP. Based on inter mode or intra mode decided by the pre-encoding, MBs with the same mode can be grouped into a basic unit, because the statistics of inter MBs and intra MBs are different. MBs can also be grouped based on the coefficient information of the pre-encode operation. If one MB in a P frame has a non-zero coefficient, we will let this MB be a basic unit.

$f_r(k)$ denotes the number of remaining bits after encoding basic unit k in the frame j. Initially, $f_r(0)=R(j)$. The number of coefficient bits spent on the current basic unit is calculated as $$b(BU_k) = f_r(k-1) \times \frac{\beta(BU_k)}{\beta(n_{j,k})},$$

where $\beta(BU_k)$ is the complexity metric of the basic unit to be encoded, and $\beta(n_{j,k})$ is the complexity metric of the remaining frame.

Meanwhile, the first pass generated basic unit header size $b_{1,hdr}(BU_k)$ should also be considered. If $b_{1,hdr}(BU_k)<b(BU_k)$, $\hat{b}_{2,hdr}(BU_k)=b_{1,hdr}(BU_k)$, and $\hat{b}b_{2,coeff}(BU_k)=b(BU_k)-\hat{b}_{2,hdr}(BU_k)$. $Q_b$ can then be calculated: $Q_b=MAX\_BASE\_QP$, where $\hat{b}_{2,hdr}(BU_k)$ is the estimated number of the encoded base layer header bits, $\hat{b}_{2,coeff}(BU_k)$ is the estimated number of the encoded base layer coefficient bits, and MAX_BASE_QP is the maximum base layer QP. Usually, MAX_BASE_QP is chosen to make the base layer provide the minimum acceptable quality.

The basic unit QP is assigned according to the exponential model $R=\alpha^{Q-Q_1}b_{1,coeff}(BU_k)$, where $b_{1,coeff}(BU_k)$ is the estimated number of the $1^{st}$ pass coefficient bits, $Q_1$ is the $1^{st}$ pass encoding QP, and $\alpha$ is a parameter updated on a frame-by-frame basis using linear regression. Intra MBs and Inter MBs use different $\alpha$. $f_r(k)$ will be updated according to the number of bits used $\overline{b}(BU_k)$, $f_r(k)=f_r(k-1)-\overline{b}(BU_k)$.

The above discussion focuses on determining frame sizes, however, the principles and methods discussed with respect to frames may be applied to any other portions of the data, such as macroblocks and basic units, which comprise macroblocks of similar characteristics. In some embodiments, the principles and methods discussed with respect to frame size determination can be applied to portions of the multimedia data of different sizes. For example, each frame with in the GOP can be allocated a bandwidth according to the remaining available bandwidth for the GOP, the characterizing parameters of the frame, and the characterizing parameters of the remaining frames of the GOP, as described above. In addition, macroblocks within one or more frames can be allocated a bandwidth according to the remaining available bandwidth for the one or more frames, the characterizing parameters of the macroblock, and the characterizing parameters of the remaining macroblocks or other portions of the one or more frames. Numerous other embodiments applying the principles to various portions and combinations of portions of multimedia data are also possible.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed embodiments is provided to enable any person skilled in the art to make or use the present invention. Various modifications to these embodiments will be readily apparent to those skilled in the art, and the generic principles defined herein may be applied to other examples and additional elements may be added without departing from the spirit or scope of the invention. Thus, the present invention is not intended to be limited to the embodiments shown herein but is to be accorded the widest scope consistent with the principles and novel features disclosed herein.

What is claimed is:

1. A method of encoding multimedia data having a plurality of portions into first and second layers, each of the first and second layers having an associated transmission bandwidth, the method comprising:
   determining a transmission bandwidth relationship between the transmission bandwidth of the first layer and the transmission bandwidth of the second layer;
   pre-encoding the multimedia data to generate one or more characterizing parameters of the multimedia data, the characterizing parameters including complexity metrics associated with transmitting each of the plurality of portions of the multimedia data, after an encoding operation, over a superframe containing one second of multimedia data; and
   encoding, based on the complexity metrics, the multimedia data to generate the first and second layers such that the portions of the multimedia data are distributed between the generated first and second layers in a manner that allows each of the first and second layers to be transmitted over the superframe in accordance with their associated bandwidths while satisfying the determined transmission bandwidth relationship.

2. The method of claim 1, wherein the relationship comprises a ratio.

3. The method of claim 2, wherein the ratio is substantially 1:1.

4. The method of claim 1, wherein pre-encoding the multimedia data comprises pre-encoding at a pre-encoding quality, and encoding the multimedia data comprises encoding the multimedia data into the second layer at a second layer quality, wherein the pre-encoding quality is substantially equal to the second layer quality.

5. The method of claim 1, wherein pre-encoding the multimedia data comprises pre-encoding at a pre-encoding quality, and encoding the multimedia data comprises encoding the multimedia data into the second layer at a second layer quality, wherein the pre-encoding quality is higher than the second layer quality.

6. The method of claim 1, wherein the characterizing parameters are determined in part by complexity of the pre-encoded multimedia data.

7. The method of claim 1, wherein pre-encoding the multimedia data comprises pre-encoding a plurality of portions of the multimedia data to generate one or more characterizing parameters associated with each of the plurality of portions, and encoding the multimedia data comprises encoding each of the plurality of portions of the multimedia data into a corresponding portion of the first layer, wherein each portion of the first layer has a bandwidth based on the associated characterizing parameters of the corresponding portion of multimedia data and on the associated characterizing parameters of one other portion of the multimedia data.

8. The method of claim 1, wherein the quality of the first layer is adjusted to adjust the bandwidth of the first layer.

9. The method of claim 1, wherein the pre-encoded multimedia data comprises header information, motion vector information, and residue information, and the encoded second layer comprises residue information encoded at a second layer quality.

10. The method of claim 9, wherein the encoded first layer comprises header information and residue information.

11. The method of claim 10, wherein the encoded first layer comprises the header information and the motion vector information encoded at the second layer quality, and the residue information encoded at a first layer quality, wherein the first layer quality is determined to substantially satisfy the relationship.

12. An apparatus configured to encode multimedia data having a plurality of portions into first and second layers, each of the first and second layers having corresponding transmission bandwidth, the apparatus comprising:
   a determination unit for determining a transmission bandwidth relationship between the transmission bandwidth of the first layer and the transmission bandwidth of the second layer;
   a pre-encoder configured to pre-encode the multimedia data to generate one or more characterizing parameters of the multimedia data, the characterizing parameters including complexity metrics associated with transmitting each of the plurality of portions of the multimedia data, after an encoding operation, over a superframe containing one second of multimedia data; and
   an encoder configured to encode, based on the complexity metrics, the multimedia data to generate the first and second layers such that the portions of the multimedia data are distributed between the generated first and second layers in a manner that allows each of the first and second layers to be transmitted over the superframe in accordance with their corresponding transmission bandwidths while satisfying the determined transmission bandwidth relationship.

13. The apparatus of claim 12, wherein the relationship comprises a ratio.

14. The apparatus of claim 12, wherein the pre-encoder is configured to pre-encode at a pre-encoding quality, and the encoder is configured to encode the multimedia data into the second layer at a second layer quality, wherein the pre-encoding quality is substantially equal to the second layer quality.

15. The apparatus of claim 12, wherein the pre-encoder is configured to pre-encode the multimedia data at a pre-encoding quality, and the encoder is configured to encode the multimedia into the second layer at a second layer quality, wherein the pre-encoding quality is higher than the second layer quality.

16. The apparatus of claim 12, wherein the pre-encoder is configured to determine the characterizing parameters based at least in part on a complexity of the pre-encoded multimedia data.

17. The apparatus of claim 12, wherein the pre-encoder is configured to pre-encode a plurality of portions of the multimedia data to generate one or more characterizing parameters associated with each of the plurality of portions, and the encoder is configured to encode each of the plurality of portions of the multimedia data into a corresponding portion of the first layer, wherein each portion of the first layer has a bandwidth based at least in part on the associated characterizing parameters of the corresponding portion of multimedia data and on the associated characterizing parameters of at least one of the other portions of the multimedia data.

18. The apparatus of claim 12, wherein the quality of the first layer is adjusted to adjust the bandwidth of the first layer.

19. The apparatus of claim 12, wherein the pre-encoded multimedia data comprises header information, motion vector information, and residue information, and the encoded second layer comprises residue information encoded at a second layer quality.

20. The apparatus of claim 19, wherein the encoded first layer comprises header information and residue information.

21. The apparatus of claim 20, wherein the encoded first layer comprises the header information and the motion vector information encoded at the second layer quality, and the residue information encoded at a first layer quality, wherein the first layer quality is determined to substantially satisfy the relationship.

22. An apparatus configured to encode multimedia data having a plurality of portions into first and second layers, each of the first and second layers having corresponding transmission bandwidth, the apparatus comprising:
  means for determining a transmission bandwidth relationship between the transmission bandwidth of the first layer and the transmission bandwidth of the second layer;
  means for pre-encoding the multimedia data to generate one or more characterizing parameters of the multimedia data, the characterizing parameters including complexity metrics associated with transmitting each of the plurality of portions of the multimedia data, after an encoding operation, over a superframe containing one second of multimedia data; and
  means for encoding, based on the complexity metrics, the multimedia data to generate the first and second layers such that the portions of the multimedia data are distributed between the generated first and second layers in a manner that allows each of the first and second layers to be transmitted over the superframe in accordance with their corresponding transmission bandwidths while satisfying the determined transmission bandwidth relationship.

23. The apparatus of claim 22, wherein the relationship comprises a ratio.

24. The apparatus of claim 22, wherein the means for pre-encoding is configured to pre-encode at a pre-encoding quality, and the means for encoding is configured to encode the multimedia data into the second layer at a second layer quality, wherein the pre-encoding quality is substantially equal to the second layer quality.

25. The apparatus of claim 22, wherein the means for pre-encoding is configured to pre-encode the multimedia data at a pre-encoding quality, and the means for encoding is configured to encode the multimedia into the second layer at a second layer quality, wherein the pre-encoding quality is higher than the second layer quality.

26. The apparatus of claim 22, wherein the means for pre-encoding is configured to generate the characterizing parameters based at least in part on the complexity of the pre-encoded multimedia data.

27. The apparatus of claim 22, wherein the means for pre-encoding is configured to pre-encode a plurality of portions of the multimedia data to generate one or more characterizing parameters associated with each of the plurality of portions, and the means for encoding is configured to encode each of the plurality of portions of the multimedia data into a corresponding portion of the first layer, wherein each portion of the first layer has a bandwidth based at least in part on the associated characterizing parameters of the corresponding portion of multimedia data and on the associated characterizing parameters of at least one of the other portions of the multimedia data.

28. The apparatus of claim 22, wherein the quality of the first layer is adjusted to adjust the bandwidth of the first layer.

29. The apparatus of claim 22, wherein the pre-encoded multimedia data comprises header information, motion vector information, and residue information, and the encoded second layer comprises residue information encoded at a second layer quality.

30. The apparatus of claim 29, wherein the encoded first layer comprises header information and residue information.

31. The apparatus of claim 30, wherein the encoded first layer comprises the header information and the motion vector information encoded at the second layer quality, and the residue information encoded at a first layer quality, wherein the first layer quality is determined to substantially satisfy the relationship.

32. A non-transitory storage medium having stored thereon processor-executable instructions configured to cause a processor to perform operations for encoding multimedia data having a plurality of portions into first and second layers, each of the first and second layers having corresponding transmission bandwidth, the operations comprising:
  determining a transmission bandwidth relationship between the transmission bandwidth of the first layer and the transmission bandwidth of the second layer;
  pre-encoding the multimedia data to generate one or more characterizing parameters of the multimedia data, the characterizing parameters including complexity metrics associated with transmitting each of the plurality of portions of the multimedia data, after an encoding operation, over a superframe containing one second of multimedia data; and
  encoding, based on the complexity metrics, the multimedia data to generate the first and second layers such that the portions of the multimedia data are distributed between the generated first and second layers in a manner that allows each of the first and second layers to be transmitted over the superframe in accordance with their corresponding transmission bandwidths while satisfying the determined transmission bandwidth relationship.

33. The non-transitory storage medium of claim 32, wherein the stored processor-executable instructions are further configured such that the relationship comprises a ratio.

34. The non-transitory storage medium of claim 32, wherein the stored processor-executable instructions are further configured such that pre-encoding the multimedia data comprises pre-encoding at a pre-encoding quality, and encoding the multimedia data comprises encoding the multimedia data into the second layer at a second layer quality, wherein the pre-encoding quality is substantially equal to the second layer quality.

35. The non-transitory storage medium of claim 32, wherein the stored processor-executable instructions are further configured such that pre-encoding the multimedia data comprises pre-encoding at a pre-encoding quality, and encoding the multimedia data comprises encoding the multimedia data into the second layer at a second layer quality, wherein the pre-encoding quality is higher than the second layer quality.

36. The non-transitory storage medium of claim 32, wherein the stored processor-executable instructions are further configured such that the characterizing parameters are determined based at least in part on complexity of the pre-encoded multimedia data.

37. The non-transitory storage medium of claim 32, wherein the stored processor-executable instructions are further configured such that pre-encoding the multimedia data comprises pre-encoding a plurality of portions of the multimedia data to generate one or more characterizing parameters associated with each of the plurality of portions, and encoding the multimedia data comprises encoding each of the plurality of portions of the multimedia data into a corresponding portion of the first layer, wherein each portion of the first layer has a bandwidth based at least in part on the associated characterizing parameters of the corresponding portion of multimedia data and on the associated characterizing parameters of at least one of the other portions of the multimedia data.

38. The non-transitory storage medium of claim 32, wherein the stored processor-executable instructions are further configured such that the quality of the first layer is adjusted to adjust the bandwidth of the first layer.

39. The non-transitory storage medium of claim 32, wherein the stored processor-executable instructions are further configured such that the pre-encoded multimedia data comprises header information, motion vector information, and residue information, and the encoded second layer comprises residue information encoded at a second layer quality.

40. The non-transitory storage medium of claim 39, wherein the stored processor-executable instructions are further configured such that the encoded first layer comprises header information and residue information.

41. The non-transitory storage medium of claim 40, wherein the stored processor-executable instructions are further configured such that the encoded first layer comprises the header information and the motion vector information encoded at the second layer quality, and the residue information encoded at a first layer quality, wherein the first layer quality is determined to substantially satisfy the relationship.

42. A processor for encoding multimedia data having a plurality of portions into first and second layers, each of the first and second layers having an associated transmission bandwidth, the processor being configured to perform operations comprising:
 determining a transmission bandwidth relationship between the transmission bandwidth of the first layer and the transmission bandwidth of the second layer;
 pre-encoding multimedia data to generate one or more characterizing parameters of the multimedia data, the characterizing parameters including complexity metrics associated with transmitting each of the plurality of portions of the multimedia data, after an encoding operation, over a superframe containing one second of multimedia data; and
 encoding, based on the complexity metrics, the multimedia data to generate the first and second layers such that the portions of the multimedia data are distributed between the generated first and second layers in a manner that allows each of the first and second layers to be transmitted, over the superframe, in accordance with their corresponding transmission bandwidths while satisfying the determined transmission bandwidth relationship.

43. The processor of claim 42, wherein the relationship comprises a ratio.

44. The processor of claim 42, wherein the processor is further configured to:
 pre-encode a plurality of portions of the multimedia data to generate one or more characterizing parameters associated with each of the plurality of portions; and
 to encode each of the plurality of portions of the multimedia data into a corresponding portion of the first layer, wherein each portion of the first layer has a bandwidth based at least in part on the associated characterizing parameters of the corresponding portion of multimedia data and on the associated characterizing parameters of at least one of the other portions of the multimedia data.

45. The processor of claim 42, wherein the pre-encoded multimedia data comprises header information, motion vector information, and residue information, and the encoded second layer comprises residue information encoded at a second layer quality.

46. The processor of claim 45, wherein the encoded first layer comprises header information and residue information.

47. The processor of claim 46, wherein the encoded first layer comprises the header information and the motion vector information encoded at the second layer quality, and the residue information encoded at a first layer quality, wherein the first layer quality is determined to substantially satisfy the relationship.

\* \* \* \* \*